(12) United States Patent
Strunk-Westermann et al.

(10) Patent No.: US 10,906,276 B2
(45) Date of Patent: Feb. 2, 2021

(54) MULTILAYER POLYOLEFIN FILM

(71) Applicant: CONSTAB Polyolefin Additives GmbH, Ruethen (DE)

(72) Inventors: Andreas Strunk-Westermann, Wetter (DE); Patrick Brandhoff, Bueren (DE)

(73) Assignee: CONSTAB Polyolefin Additives GmbH, Ruethen (DE)

( * ) Notice: Subject to any disclaimer, the term of this patent is extended or adjusted under 35 U.S.C. 154(b) by 0 days.

(21) Appl. No.: 16/337,005

(22) PCT Filed: Sep. 28, 2017

(86) PCT No.: PCT/EP2017/074653
§ 371 (c)(1),
(2) Date: Apr. 18, 2019

(87) PCT Pub. No.: WO2018/060345
PCT Pub. Date: Apr. 5, 2018

(65) Prior Publication Data
US 2020/0139685 A1    May 7, 2020

(30) Foreign Application Priority Data
Sep. 28, 2016  (DE) .......... 10 2016 118 357

(51) Int. Cl.
*B32B 27/08* (2006.01)
*B32B 27/18* (2006.01)
*B32B 27/32* (2006.01)

(52) U.S. Cl.
CPC .............. *B32B 27/08* (2013.01); *B32B 27/18* (2013.01); *B32B 27/32* (2013.01); *B32B 2250/03* (2013.01); *B32B 2250/242* (2013.01); *B32B 2307/7244* (2013.01); *B32B 2307/7246* (2013.01); *B32B 2439/70* (2013.01)

(58) Field of Classification Search
CPC ............ B32B 2250/03; B32B 2250/05; B32B 2250/242; B32B 2264/00; B32B 2307/30; B32B 2307/7242; B32B 2307/7244; B32B 2307/7246; B32B 2307/726; B32B 2307/732; B32B 2439/70; B32B 27/08; B32B 27/18; B32B 27/32
See application file for complete search history.

(56) References Cited

U.S. PATENT DOCUMENTS

| 2004/0197584 A1 | 10/2004 | Jeschke |
| 2008/0286547 A1 | 11/2008 | Hubbard et al. |
| 2011/0143155 A1* | 6/2011 | Aubee ............ B32B 27/18 |
| | | 428/474.4 |

FOREIGN PATENT DOCUMENTS

WO         02/38383  A1    5/2002

OTHER PUBLICATIONS

International Search Report in PCT/EP2017/074653, dated Jan. 17, 2018.
Miillard 3988 (Clarifying Agent) by Milliken: Technical Data Sheet, The material selection platform Polymer Additives, SpecialChem, 6 pages, downloaded Oct. 9, 2020.

* cited by examiner

*Primary Examiner* — Lawrence D Ferguson
(74) *Attorney, Agent, or Firm* — Collard & Roe, P.C.

(57) ABSTRACT

The invention relates to a multilayer polyolefin film with improved barrier effect against oxygen and water vapor and having at least one core layer and two cover layers, in which at least one layer contains a hydrocarbon resin and a nucleating agent.

10 Claims, No Drawings

MULTILAYER POLYOLEFIN FILM

CROSS REFERENCE TO RELATED APPLICATIONS

This application is the National Stage of PCT/EP2017/074653 filed on Sep. 28, 2017, which claims priority under 35 U.S.C. § 119 of German Application No. 10 2016 118 357.1 filed on Sep. 28, 2016, the disclosure of which is incorporated by reference. The international application under PCT article 21(2) was not published in English.

The invention relates to a multilayer polyolefin film that has at least one core layer and two cover layers. The polyolefin film has an improved barrier effect against oxygen and water vapor.

Multilayer polyolefin layers are known and are frequently used for packaging purposes, for example for packaging of foods containing moisture, such as, for example, meat, cheese, salad, fresh fruit and fresh vegetables. If the food is not packaged directly in the film, a shell is frequently used, in which the packaged goods are contained and which is sealed with such a film.

Polyolefins are hydrophobic materials, and so films produced from them are largely impermeable to water vapor and air. However, the layer thicknesses of 20 to 100 µm used are not suitable for completely excluding moisture and oxygen. Over time—from several days to a few weeks—the packaged goods may be spoiled by oxygen and water vapor penetrating from the air. Moreover, packaged foods may lose water.

Multilayer polyolefin films usually consist of a core layer and mostly have, on both sides, a cover layer, which serves to optimize the useful properties of the film further. As the case may be, intermediate layers are also situated between the core layer and the cover layers, and so, besides three-layer films, for example, four-layer and five-layer films can also be found on the market. Depending on degree of similarity, the intermediate layers may be regarded as further core layers or cover layers. These cover layers contain adjuvants, which above all serve for the improvement of the surface properties of the films. Such adjuvants are, for example, non-stick agents and anti-fogging agents.

As already explained, it is a problem, especially for packaged foods, to keep the moisture contained in the package constant—i.e. to prevent drying out of the packaged goods—and also to prevent the penetration of oxygen—i.e. to protect the packaged food from oxidation. Frequently, it is also necessary to protect the packaged goods from penetrating moisture. The barrier effect of conventional films is usually sufficient over short time periods, but over longer time it represents a factor limiting the shelf life.

Accordingly, it is the task of the invention to provide a film that has an improved barrier effect toward oxygen and water vapor, albeit without being impaired in its other properties important for use.

This task is accomplished with a polyolefin film of the type mentioned in the introduction, in which at least one layer contains a hydrocarbon resin and a nucleating agent, especially in the same layer.

Multilayer polyolefin layers according to the invention have a core layer, which is embedded in cover layers disposed on both sides. In addition, still further layers which, depending on composition and properties, may be rated as further core layers or additional cover layers, may be disposed between cover layer and core layer.

At least one layer of the polyolefin film according to the invention contains a hydrocarbon resin, preferably together with a nucleating agent. Both components are present together in one layer. In an arrangement of the two components in different layers, the purpose according to the invention is accomplished when the two components come together by migration, for example from neighboring layers.

Hydrocarbon resins are synthetic resins, which are formed by reaction of hydrocarbons with themselves in the presence of catalysts. They usually have an average molecular weight of less than 2000 and softening points in the range of approximately 100 to higher than 200° C. They are used as modifiers in the paint, printing-ink and polymer chemistry.

Frequently related types of hydrocarbon resins are the DCPD, $C_5$ and $C_9$ resins, which are used as modifiers in the plastic chemistry. These resins usually have a softening point in the range of 100 to 180° C.

The designations $C_5$ resin and $C_9$ resin relate to the respectively used basic monomers of the resins, which are obtained from the $C_5$ and respectively $C_9$ fraction, which are formed during thermal cracking of higher hydrocarbons, for example from naphtha. The designation $C_5$ resins likewise includes those resins in the production of which only some few or even only individual monomers of this fraction find use, especially resins that are produced predominantly from dicyclopentadiene (DCPD), the dimer of cyclopentadiene. The latter are also referred to frequently as DCPD resins. The designation $C_9$ resins likewise includes those resins in the production of which only some few or even only individual monomers of this fraction find use, especially resins that to a predominant proportion are produced from α-methylstyrene.

Frequently, hydrocarbon resins are hydrogenated following the polymerization, in order to saturate existing double bonds and thereby to adjust the miscibility with plastics selectively. The hydrogenation may be performed completely or else only partly. The resins that find use in the film according to the invention may be completely hydrogenated and also only partly hydrogenated resins.

Nucleating agents are used in plastics technology for acceleration of the crystallization and for increase of the transparency. These are mostly substances that act as crystallization nuclei. A higher degree of crystallization of the polymer is favorable for the properties of the plastic. In addition, a series of nucleating agents improves the transparency of the plastic.

Widely used nucleating agents are, for example, benzoic acid salts, metal salts of dicarboxylic acids, for example hexahydrophthalic acid, sorbitol acetals, phosphate ester salts, glycolate salts, diamides, triamides and tetraamides, naphthalene dicarboxylic acid salts and amides, polyvinylcyclohexane, and also natural substances such as talc. Combinations of phosphate ester salts and sorbitol acetates have been proposed for the modification of polyolefin films. A large number of nucleating agents has been developed by the Milliken Chemical Company.

It has now been surprisingly found that the modification of polyolefins with a combination of hydrocarbon resins and nucleating agents significantly improves the barrier effect of these plastics toward water vapor and oxygen. For this purpose, the two modifiers are preferably introduced into the core layer or into one or more of the core layers. In the case of the presence of several core layers, preferably all core layers are modified with the hydrocarbon resin and the nucleating agent.

As a rule, the cover layers do not contain any hydrocarbon resin or nucleating agent, but these may also be introduced here in order to enhance the barrier effect.

The hydrocarbon resin is present in the polymer in a quantity of 5 to 20 wt %, preferably 6 to 12 wt %. This is accompanied by a quantity of 0.1 to 1 wt % of nucleating agent, especially 0.2 to 0.8 wt %.

The polyolefins according to the invention preferably consist of polyethylene, polypropylene or their copolymers. Preferred polypropylene films are such in which the core layer consists in particular of a homopolymer and the cover layers consist of a random copolymer containing ethylene or a terpolymer containing ethylene, propylene, butylene and/ or further □-olefins.

Preferred hydrocarbon resins are such of DCPD (dicyclopentadiene), $C_5$ and $C_9$ type or mixtures thereof having an average molecular weight of less than 2000 and a softening point in the range of 120 to 160° C. Mixtures include physical mixtures in solid or plasticized form and likewise mixtures that are produced by copolymerization of different monomer species from the C5 and C9 fraction. Such hydrocarbon resins are available, for example, from the Eastman Co. under the designation Plastolyn R1140 ($C_9$) and from ExxonMobil under the designation Oppera PR100N (DCPD).

Examples of nucleating agents are sorbitol derivatives, such as sorbitol acetals.

Preferred nucleating agents are such of the sorbitol type, for example bis(4-propylbenzylidene)propylsorbitol, obtainable from the Milliken Co. under the designation Millad NX 8000, or Millad 3988.

A further preferred nucleating agent is N-[3,5-bis-(2,2-dimethylpropionylamino)phenyl]-2,2-dimethylpropionamide.

Standard adjuvants, which permit a good processing in the extrusion method, may be contained in the core layer or the core layers. The cover layers usually contain an antiblocking agent, which reduces the adhesion of the product during the extrusion and on the roll and increases the sliding ability. Such antiblocking agents are usually contained in the polymer in a quantity of 0.05 to 0.5 wt %, especially 0.1 to 0.3 wt %. A standard antiblocking agent is, for example, the product Sylobloc 45 of the Grace Co., on the basis of silica.

According to the invention, three-layer and five-layer films having a total thickness of 20 to 70 μm are preferred. In these three-layer films, each cover layer accounts for 5 to 20% of the total thickness and the core layer for 60 to 90%. In the five-layer films, the distribution is 5 to 15% of the total thickness per cover layer, 10 to 20% for each of the intermediate layers and 30 to 70% for the core layer. In this case, the intermediate layer and the core layer preferably consist of a polypropylene homopolymer and the cover layers consist of a polypropylene random copolymer containing ethylene or a terpolymer of ethylene, propylene, butylene or possibly further α-olefins. The adjuvants according to the invention are then contained in the intermediate layers and the core layer. In this respect, the intermediate layers are further core layers.

The multilayer polyolefin films according to the invention have a series of advantageous properties, which can be attributed to the combination of the hydrocarbon resin with the nucleating agent. These are on the one hand the improvements of the barrier effect toward oxygen, which may be as much as 58% (lower permeability) and the barrier effect for water vapor, which may be as much as 42% (reduced permeability).

Besides the improvement of the barrier effect, a distinct increase is further achieved in the modulus of elasticity and in the tensile strength of the films modified in this way.

It is assumed that the improvement of the barrier effect due to the nucleating agent is not attributed to the agent itself but instead is indirectly a consequence of the crystallization of the polyolefin, improved by the agent.

Usually, the addition of a hydrocarbon resin to a polyolefin film leads to a distinct reduction of the crystallization rate and to a lowering of the crystallization peak temperature. The hydrocarbon resin acts as a crystallization inhibitor. This crystallization inhibition is countered by the addition of the nucleating agent. It may be compensated for completely by suitable adjustment of the quantities. For an addition of up to 15 wt % of hydrocarbon resin, usually a quantity of up to 1 wt % of nucleating agent is usually completely sufficient for compensation.

The films according to the invention do not exhibit any perceptible migration of constituents in aqueous, alcoholic or acid environments. The migration of hydrocarbon resin in vegetable oil lies under the permissible limit values, as likewise does that of the nucleating agent. In this connection, it is evident that the presence of the nucleating agent reduces the overall migration, presumably on the basis of the better crystallization.

The films according to the invention are usable in particular for purposes of packaging, for example even of foods.

It will be understood that the films according to the invention may also be used in composites with other films and also in metallized form.

The invention will be explained in more detail by the following exemplary copy embodiment:

Test Film

The test film has a thickness of 35 μm and five layers: one core layer, two intermediate layers and two cover layers, with symmetric structure. Of the film thickness, the cover layers account for 5% each, the intermediate layers for 12.5% each and the core layer for 65%. A polypropylene homopolymer (Sabic PP 520P cast film type) used for the intermediate layers and the core layer and a polypropylene random copolymer (*Borealis* RD204CF cast film type) for the cover layers.

A $C_5$ resin of the Exxonmobil Co. having a softening point of 140° C. (Oppera PR100N) and a $C_9$ film of the Eastman Co. having a softening point of 140° C. (Plastolyn R1140) were used as exemplary hydrocarbon resins. The resins were added by means of a master batch having a resin content of 60% in polypropylene.

Milliken Millad NX8000 was used as nucleating agent, added by means of a master batch having 10% nucleating agent in polypropylene. The cover layers contained Sylobloc 45 as antiblocking agent, added by means of a master batch of 10% in polypropylene.

For comparison purposes, six films were produced in the casting method, wherein the film TWO in the cover layers contained only the antiblocking agent (1.5 wt %), the comparison film TW18 contained, besides the antiblocking agent in the cover layers, 9.0 wt % $C_9$ hydrocarbon resin in the intermediate layers and in the core layer, the comparison film TW20 contained 9.0 wt % DCPD hydrocarbon in the intermediate layers and the core layer and the comparison film TW27 contained only 0.4 wt % Milliken Millad NX8000 in the intermediate layers and the core layer, but no hydrocarbon resin.

The films TW25 and TW26 according to the invention contained, in addition to the hydrocarbon resin, 0.4 wt % Milliken Millad NX8000, wherein TW25 was used in combination with the $C_9$ hydrocarbon resin and TW26 in combination with the DCPD hydrocarbon resin.

The composition of the films for the tests is summarized in Table I.

Table II shows the measured values of the films produced in this way for the barrier effect for oxygen and water vapor. It is evident that the combination of a hydrocarbon resin with the nucleating agent leads to a distinct improvement of the barrier effect.

The test films described above were additionally investigated with respect to their modulus of elasticity, their tensile strength and their yield strength. The results are summarized in Table III.

It is evident that the modulus of elasticity and the tensile strength were improved by the combined use of hydrocarbon resin and nucleating agent, by 100% and 70% respectively. In the case of the yield strength, a reduction of 50% was found only for the hydrocarbon resin; the nucleating agent had no influence. For the modulus of elasticity and the tensile strength, the improvement was distinctly greater than the additive effect of the two adjuvants.

TABLE I

| Foil | Cover layer PP random | Intermediate layer PP homo | Core layer PP homo | Intermediate layer PP homo | Cover layer PP random |
|---|---|---|---|---|---|
| TW0 | 0.15% AB | — | — | — | 0.15% AB |
| TW18 | 0.15% AB | 9% $C_9$ | 9% $C_9$ | 9% $C_9$ | 0.15% AB |
| TW20 | 0.15% AB | 9% DCPD | 9% DCPD | 9% DCPD | 0.15% AB |
| TW27 | 0.15% AB | 0.4% NC | 0.4% NC | 0.4% NC | 0.15% AB |
| TW25 | 0.15% AB | 9% $C_9$ 0.4% NC | 9% $C_9$ 0.4% NC | 9% $C_9$ 0.4% NC | 0.15% AB |
| TW26 | 0.15% AB | 9% DCPD 0.4% NC | 9% DCPD 0.4% NC | 9% DCPD 0.4% NC | 0.15% AB |

AB Antiblocking agent
NC Nucleating agent
DCPD/$C_9$ DCPD/$C_9$ hydrocarbon resin
All values in wt %

TABLE II

|  | Permeability for $O_2$ | Permeability for water vapor |
|---|---|---|
| TW0 | 100% | 100% |
| TW18 | 68% | 93% |
| TW20 | 58% | 71% |
| TW27 | 68% | 88% |
| TW25 | 53% | 72% |
| TW26 | 42% | 58% |

The value for the barrier effect of the comparison film TW0 was normalized to 100%.

TABLE III

|  | Modulus of elasticity | Tensile strength | Yield strength |
|---|---|---|---|
| TW18 | +20% | +15% | −50% |
| TW27 | +60% | +50% | ±0% |
| TW25 | +100% | +70% | −50% |

The invention claimed is:

1. A multilayer polyolefin film with improved barrier effect against oxygen and water vapor and having one core layer, two intermediate layers, and two cover layers,
    wherein the two intermediate layers and the core layer contain a hydrocarbon resin and a nucleating agent,
    wherein the hydrocarbon resin is a DCPD, $C_5$ and $C_9$ resin having a softening temperature in the range of 120 to 160° C., and
    wherein the nucleating agent is N-[3,5-bis-(2,2-dimethylpropionylamino)phenyl]-2,2-dimethyl-propionamide or bis(4-propylbenzylidene)propylsorbitol or bis(3,4-dimethylbenzylidene)sorbitol.

2. The multilayer polyolefin film according to claim 1, wherein each of the two intermediate layers and the core layer contains 0.1 to 1 wt % of nucleating agent.

3. The multilayer polyolefin film according to claim 1, wherein each of the two intermediate layers and the core layer contains 5 to 20 wt % of hydrocarbon resin.

4. The multilayer polyolefin film according to claim 1 having a total thickness of 20 to 70 μm.

5. The multilayer polyolefin film according to claim 1, wherein the cover layers respectively account for 5 to 15%, the intermediate layers for 10 to 20% and the core layer for 30 to 70% of the total layer thickness.

6. The multilayer polyolefin film according to claim 1, wherein the cover layers are modified with an antiblocking agent.

7. The multilayer polyolefin film according to claim 6, further comprising 0.05 to 0.5 wt % antiblocking agent in the cover layers.

8. The multilayer polyolefin film according to claim 1, wherein the core layer contains a polypropylene homopolymer.

9. The multilayer polyolefin film according to claim 1, wherein the cover layers contain a polypropylene random polymer or a terpolymer of ethylene, propylene, butylene and/or further α-olefins.

10. The multilayer polyolefin film according to claim 1 as a food film.

* * * * *